United States Patent [19]

Fritz et al.

[11] Patent Number: 4,693,769

[45] Date of Patent: Sep. 15, 1987

[54] METHOD OF MANUFACTURING A COMBINATION OF SYNTHETIC RESIN ELEMENTS

[75] Inventors: Johannes H. Fritz; Renaat E. Van de Leest, both of Eindhoven, Netherlands

[73] Assignee: U.S. Philips Corporation, New York, N.Y.

[21] Appl. No.: 725,868

[22] Filed: Apr. 22, 1985

[30] Foreign Application Priority Data

May 22, 1984 [NL] Netherlands .................... 8401628

[51] Int. Cl.⁴ .................... B29C 37/02; B29C 65/08; B32B 31/14
[52] U.S. Cl. .................................... 156/73.1; 156/63; 156/150; 156/245; 156/267; 264/23; 264/129; 264/138; 264/161
[58] Field of Search ............... 264/23, 132, 240, 241, 264/328.8, 129, 138, 161; 156/150, 73.1, 267, 63, 245; 40/1.5, 628, 630

[56] References Cited

U.S. PATENT DOCUMENTS

| | | | |
|---|---|---|---|
| 2,492,973 | 1/1950 | Dofsen et al. | 264/161 |
| 2,510,091 | 6/1950 | Dofsen et al. | 264/161 |
| 2,566,636 | 9/1951 | Renholts | 264/328.8 X |
| 3,687,750 | 8/1972 | Jamieson | 156/63 |
| 3,783,061 | 1/1974 | Hanh | 156/73.1 |
| 4,101,385 | 7/1978 | Luch | 156/150 X |
| 4,239,724 | 12/1980 | Adell | 264/328.8 |

Primary Examiner—Jan H. Silbaugh
Assistant Examiner—Karen D. Kutach
Attorney, Agent, or Firm—Norman N. Spain

[57] ABSTRACT

The invention provides a method by means of which it becomes possible to produce emblems or wordmarks having three-dimensional symbols, both the front face and the raised side faces of which are metallized, while the substrate is not metallized. For that purpose, the symbols are injection molded with a carrier and they are not secured to a separately manufactured substrate until after the metallizing operation.

5 Claims, 4 Drawing Figures

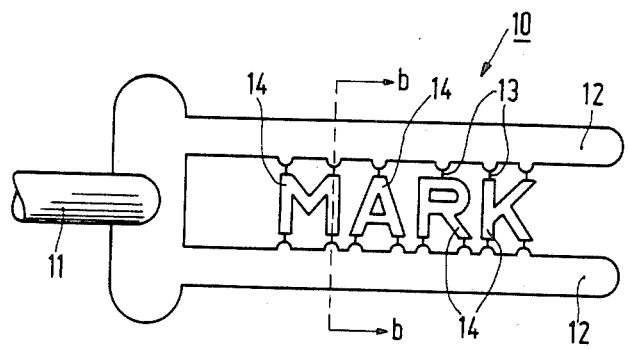 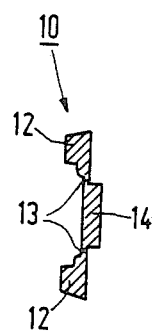
FIG.1a       FIG.1b
FIG.2a
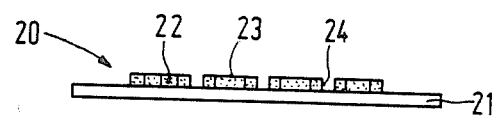
FIG.2b

METHOD OF MANUFACTURING A COMBINATION OF SYNTHETIC RESIN ELEMENTS

BACKGROUND OF THE INVENTION

The invention relates to a method of manufacturing a combination of synthetic resin elements.

The invention also relates to a carrier provided with such elements and to a combination of such elements.

Such a combination of synthetic resin elements can comprise characters or symbols which serve a decorative or distinguishing purpose, the combination forming a word mark or an emblem.

In accordance with a method which is known per se, such a combination of synthetic resin elements is formed by means of injection molding together with a substrate plate from which the elements stand out. The elements and the substrate plate always form an integral body. The front of the elements is provided with a metallic layer by bringing the elements into contact with a hot metal foil, for example, of aluminum.

SUMMARY OF THE INVENTION

It is the object of the invention to provide a method which the element are produced without a substrate while remaining in the desired disposition.

This object is achieved in accordance with the invention by means of a method in which the elements are produced as separate synthetic resin bodies each having one or more conspicuous, profiled surfaces and a plane surface which is to be attached to a substrate, which elements together with a carrier comprising connecting members are formed from a synthetic resin material, the elements being attached to the carrier by means of the connecting members, thus keeping the elements in a desired disposition. Preferably, the elements and the carrier are formed by means of injection molding.

Conspicuous surfaces are to be understood to include all surfaces of the synthetic resin elements which do not have to be attached to a substrate.

The synthetic resin elements can be detached from the carrier and be separately provided on a substrate, the elements being kept in the desired positions by, for example, suction tubes. However, it is to be preferred that the elements are attached to a substrate, after which the carrier is detached from the elements.

The substrate can be an object to be decorated, but it is also possible to attach the elements to a substrate plate, which in turn can be attached to the object to be decorated.

A secure attachment of the elements is assured if the substrate is a substrate plate of the same synthetic resin material as the elements.

The elements can be attached to the substrate by means of various known techniques, for example, clamping or glueing.

A particularly strong joint is obtained in a simple manner by attaching the elements to the substrate plate by means of ultrasonic welding. For that purpose it is necessary that the substrate plate and the elements are formed from synthetic resin materials having the same or substantially the same composition.

In a preferred embodiment of the method in accordance with the invention, the conspicuous surfaces of the elements are fully metallized before the elements are secured to a substrate. This method is applied, for example, to elements having a semi-circular section as well as to elements having a trapezoidal section, the raised side faces of which are metallized. It is indeed possible, in accordance with a prior art alternative method, to provide the assembly of a substrate and a combination of elements with a metallic layer which is thereafter coated with a coloured lacquer, any excess of which is removed from the front face of the elements before drying, but in products obtained with that prior art method only the front faces of the elements are metallized.

The metallizing operation can be carried out by means of various known techniques, for example, electroless metallization, vacuum desposition, sputtering by or any one of these techniques followed by electroplating. Subsequently, the metal layer may be colored by means of techniques which are known per se.

In order not to leave any clearly visible marks on the elements when they are servered from the carrier, the connecting members to which the element are attached should generally be of small dimensions. On the other hand, the elements must be firmly secured to the carrier and, for example, during injection molding, a sufficiently large quantity of synthetic resin material must be able to flow to the elements through the connecting members. These problems are obviated by designing the carrier so that it comprises two supporting arms between which the elements are arranged and secured thereto by means of connecting members.

According to the invention, a particularly attractive wordmark or emblem is formed if the individual elements are secured to a substrate and if conspicious surfaces of the elements are completely metallized. In the present state of the art there is no method by means of which is possible to produce a non-metallized substrate having combination of synthetic resin elements all of whose conspicious surfaces are metallized.

In a special embodiment of a substrate plate having a combination of elements in accordance with the invention, the profiled, conspicious surface of the elements comprises a front face and raised side faces, the latter being substantially perpendicular with respect to the substrate plate.

BRIEF DESCRIPTION OF THE DRAWING

In the drawing FIG. 1a is a front view of a carrier attached to a combination of elements in accordance with the invention, FIG. 1b is a sectional view along the line b—b of the carrier shown in FIG. 1a, FIG. 2a is a front view and FIG. 2b is a side view of a substrate plate bearing a combination of elements in accordance with the invention.

The invention will now be described in detail with reference to a practical embodiment and to the accompanying drawing (not drawn to scale) in which FIG. 1a is a front view of a carrier attached to a combination of elements in accordance with the invention, FIG. 1b is a sectional view along the line b—b of the carrier shown in FIG. 1a, and in which FIG. 2a is a front view and FIG. 2b is a side view of a substrate plate bearing a combination of elements in accordance with the invention.

EMBODIMENT OF THE METHOD IN ACCORDANCE WITH THE INVENTION

A carrier 10 which is shown in FIGS. 1a and 1b is formed by means of an injection molding process, in which synthetic resin material is fed forward through a sprue member 11 and fed to elements 14 through supporting arm 12 and connecting members 13. The synthetic material used is impact-proof polystyrene which is injection moulded at a temperature of 200°–250° C. However, injection moulding also permits the use of other termoplastic materials. Other shaping techniques may be used instead of injection moulding, such as compression moulding, in which it is also possible to use rubber-like or thermosetting materials.

Prior to metallizing, a preliminary treatment is carried out in which the surface of the assembly of carrier and elements is degreased by means of a gluconate solution at 60° C. and subsequently activated using a corona discharge. Other customary degreasing and activating methods (for example a plasma treatment) are also suitable.

Subsequently, a 200 nm thick nickel layer is applied to the conspicuous surfaces of the elements by means of magnetron sputtering. One plane side of the element which is afterwards attached to the substrate, is not coated, in contrast to the front and the side faces.

Next, a 8 μm thick layer of bright nickel is applied in a plating bath, if necessary followed by a 0,25 μm thick layer of chromium. Plating baths known from the general state of the art are suitable for applying a metal layer. If desired, the metal layer can be colored by means of known techniques.

By means of injection molding, a substrate plate is made of the same material as the assembly of the carrier and elements. Said assembly is placed in a mould and the substrate plate is pressed against the non-metallized side of the elements. By means of ultrasonic welding the elements are attached to the substrate plate. Finally, the carrier is cut away which results in the formation of a substrate plate integrally formed with a combination of elements 20, see FIGS. 2a and 2b. This product comprises a substrate plate 21 of a synthetic resin and elements 22 also of a synthetic resin material, all conspicuous surfaces of the elements, i.e. both the front face 23 and the raised side faces 24, being metallized.

Besides the variants mentioned herein, the method in accordance with the invention permits many more alternatives which do not adversely affect the essence of the invention. The elements can, for example, be colored by means of a method other than metallizing. It is alternatively possible to produce the substrate and the elements from the same synthetic resin material, while adding different colourants to either the substrate or the elements, or to both. The substrate may be made of another material than synthetic resin. All these variants are possible because the elements, which are to be attached to a substrate in a later stage, can be produced independently of the substrate.

What is claimed is:

1. A method of providing a substrate with a plurality of separate synthetic resin display elements attached thereto in a desired arrangement, each of said display elements being provided with a plane surface suitable for attaching said display element to said substrate and at least one conspicuous surface situated away from said plane surface, said method comprising forming, by molding, a unitary body consisting essentially of said plurality of synthetic resin display elements in said desired arrangement, a synthetic resin carrier and synthetic resin connecting members, each of said connecting members being detachably joined to said synthetic resin display elements and each of said connecting elements being joined to said carrier, fully metallizing the conspicuous surfaces of said display elements, positioning said body on said substrate so that only said plane surfaces are in contact with said substrate, attaching said thus positioned body to said substrate only at said plane surfaces and detaching said connecting members and the carrier connected thereto from said synthetic resin display elements.

2. The method of claim 1 characterized in that the unitary body is formed by means of injection molding.

3. The method of claim 1 wherein the carrier comprises two supporting arms between which the elements are arranged and secured by means of the connecting members.

4. A method as claimed in claim 1, characterized in that the substrate is a substrate plate of the same synthetic resin material as the elements.

5. A method as claimed in claim 4, characterized in that the elements are attached to the substrate plate by means of ultrasonic welding.

* * * * *